United States Patent [19]

Cakmakci

[11] Patent Number: 4,836,968
[45] Date of Patent: Jun. 6, 1989

[54] METHOD OF MAKING FIBER OPTIC DUCT INSERT

[75] Inventor: Mehmet Y. Cakmakci, Rochester Hills, Mich.

[73] Assignee: Sterling Engineered Products Inc., Maumee, Ohio

[21] Appl. No.: 38,505

[22] Filed: Apr. 15, 1987

[51] Int. Cl.⁴ .............................................. B29C 47/88
[52] U.S. Cl. ............................ 264/177.19; 264/209.3; 264/209.7; 264/237; 264/285
[58] Field of Search .............. 264/209.8, 209.7, 209.3, 264/177.17, 177.19, 285, 46.1, 339, 237; 425/114, 380, 467; 156/244.12–244.15; 138/115

[56] References Cited

U.S. PATENT DOCUMENTS

| | | | |
|---|---|---|---|
| 2,137,887 | 11/1938 | Abbott | 264/177.17 |
| 3,164,948 | 1/1965 | Stratford | 264/177.17 |
| 3,430,994 | 3/1969 | Keeler II | 264/177.17 |
| 3,445,052 | 5/1969 | Lewallen | 264/339 |
| 3,771,934 | 11/1973 | Delves-Broughton | 425/380 |
| 4,073,673 | 2/1978 | Raabe et al. | 264/177.17 |
| 4,474,426 | 10/1984 | Yataki | 264/1.5 |
| 4,479,702 | 10/1984 | Pryor et al. | 264/1.5 |

Primary Examiner—Jeffery Thurlow
Attorney, Agent, or Firm—Marshall & Melhorn

[57] ABSTRACT

A multi-chambered conduit insert includes at least two spaced-apart longitudinally extending substantially parallel first and second chambers. The cross-sectional configuration of each of the chambers is defined by generally parallel inner and outer side walls joined at one edge thereof by a base wall and joined in an opposite edge thereof by a top wall. A hinge portion connects adjacent edges of the inner walls and the base walls of the chambers together. Opposite ends of the inner walls are spaced farther apart than the adjacent ends of the inner walls in order to expose the exterior surfaces of the inner walls to a cooling medium during the manufacturing process. In one embodiment, the hinge portion can function as a living hinge.

5 Claims, 2 Drawing Sheets

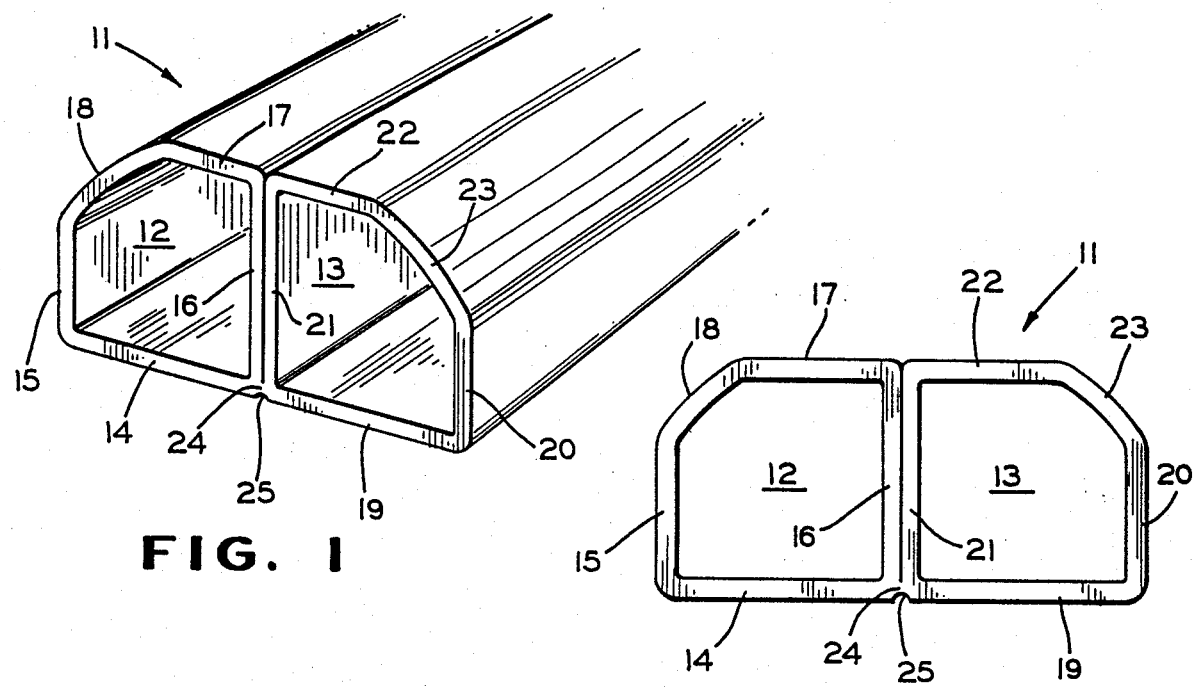
FIG. 1
FIG. 2
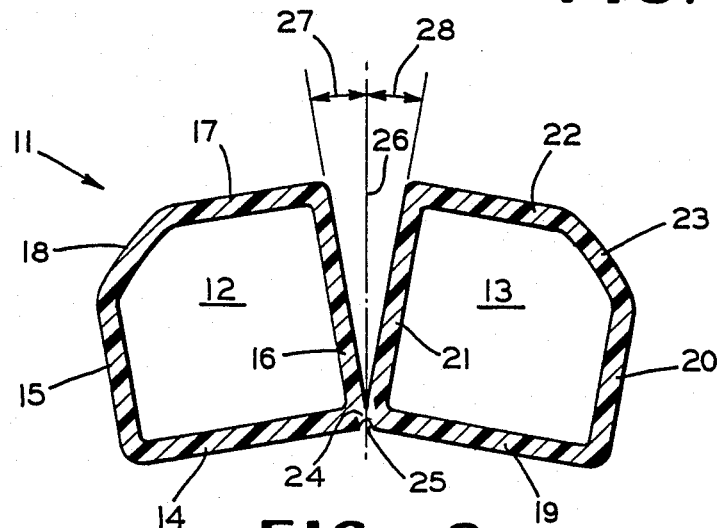
FIG. 3
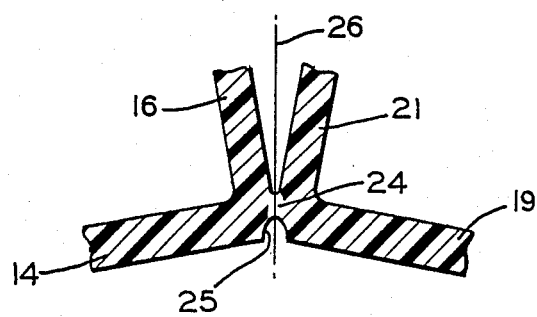
FIG. 4

METHOD OF MAKING FIBER OPTIC DUCT INSERT

BACKGROUND OF THE INVENTION

The present invention relates generally to a conduit assembly utilized to house a fiber optic cable and, in particular, to a conduit insert utilized to convert a single chambered conduit into a multi-chambered conduit capable of housing a plurality of fiber optic cables.

The use of telephonic communication is increasing throughout the world. In the past, as telephone use increased, additional electrically conductive cable was installed to accommodate the increased demand. In most metropolitan areas, cable used in the telephonic industry is generally placed in underground conduits. Typically, the underground conduit has an annular cross-section and is formed of a plastic material such as a polyvinylchloride, for example. Such a plastic material provides the conduit with several advantages which include: (1) a high strength to weight ratio, (2) an effective environment for protecting the associated cable, and (3) a long life-cycle due to the inertness of the plastic material.

The increase in telephone use in certain highly populated areas has made it economical for the telephone companies to commence some significant and expensive changes in the mode of transmitting information telephonically. As mentioned above, the conventional medium used for conducting telephone messages has been cable formed of a plurality of individual electrically conductive wires. Many extraordinary developments have been made relating to increasing the efficiency of the telephone system by increasing the number of messages which can be conducted over a single wire. However, there are manifest limitations to the use of conventional, electrically conductive wires.

Recently, the telephone companies have had an additional option to consider when evaluating the parameters necessary to expand a given system to meet the increased demands. Fiber optics has presented an interesting possible option. Fiber optics can be successfully used for transmitting information by utilizing light energy, rather than electrical energy, as the conveyor of the information. Among the advantages of utilizing fiber optics is the increased rapidity in which information can be transmitted and the increased quanta of information which can be transmitted within a given cross sectional area.

Therefore, at the point of time when the existing telephone cable network is at its capacity and, in order to increase the capacity, the underground duct network would have to be replaced, fiber optics becomes a viable alternative. Since the physical characteristics of fiber optics are different from electrical cable, different handling and installation methods are required. For a number of reasons, it is considered beneficial to house fiber optic bundles in discreet housing rather than the conventional single chambered conduit used to house the previously electrically conductive cable.

SUMMARY OF THE INVENTION

The present invention relates to a multi-chambered conduit insert which can be utilized to convert a single chambered conduit into a multi-chambered conduit. In particular, the conduit insert includes a plurality of cooperating longitudinally extending walls defining a plurality of parallel spaced apart coextensive chambers. The outer wall of each chamber which is adjacent the inner supporting surface of the single chambered conduit has a configuration wherein, if the outer wall contacts the inner conduit surface when the conduit insert is inserted within the conduit, such contact is line-to-line contact. This construction results in minimal contact of the insert with the interior wall of the existing conduit and enables the multi-chambered conduit insert to be fed into the existing conduit with the expenditure of minimal energy. In the method of the present invention, two individual conduit inserts are placed in back-to-back relationship to form an insert assembly which is subsequently inserted into the single chambered conduit.

One method of manufacturing a conduit insert according to the present invention is to continuously extrude the plastic material into the desired shape. Such a process requires heat and pressure whereby the finished insert typically must be cooled before being wound on a spool for shipping. Since the conduit insert is a continuous multichambered body, the interior walls are not directly exposed to the cooling medium and, therefore cool much more slowly than the exterior walls. Thus, there is a substantial reduction in the speed at which the conduit can be formed to allow the interior walls to sufficiently cool. The present invention provides a multi-chambered conduit insert in which all of the walls of each chamber are exterior walls and the chambers are connected together utilizing a living hinge or the like.

BRIEF DESCRIPTION OF THE DRAWINGS

The above, as well as other objects and advantages of the invention, will become readily manifest to those skilled in the art from reading the following detailed description of a preferred embodiment of the invention when considered in the light of the accompanying drawings in which:

FIG. 1 is a perspective view of a multi-chambered conduit insert of one embodiment of the present invention;

FIG. 2 is an end elevational view of the conduit insert shown in FIG. 1;

FIG. 3 is a cross-sectional view of the conduit insert of FIG. 1 illustrating the relationship of the separate chambers as the conduit insert is being formed;

FIG. 4 is an enlarged fragmentary view of the area connecting the chambers of the conduit insert shown in FIG. 3;

DETAILED DESCRIPTION OF THE PREFERRED EMBODIMENT

Figure 5:
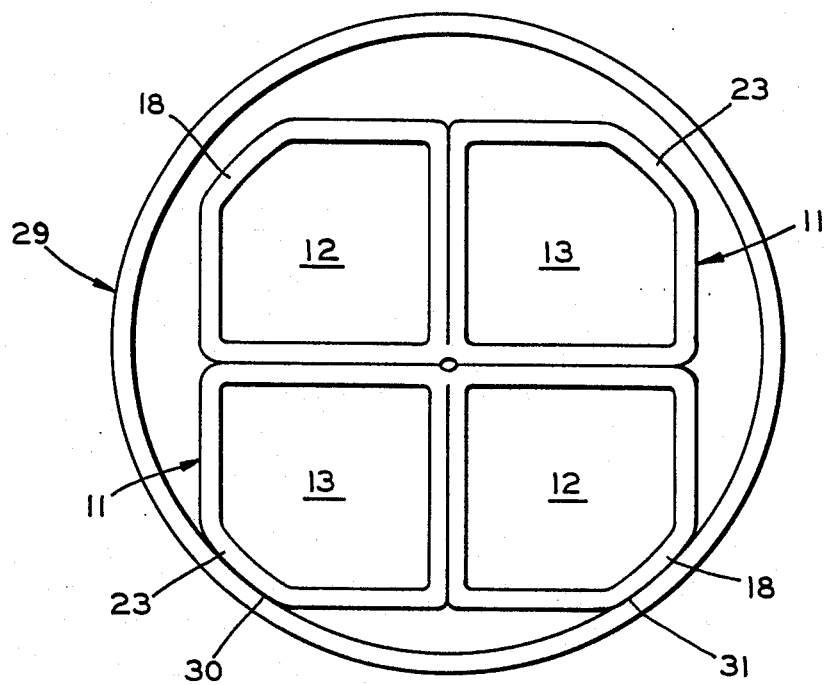
FIG. 5 is a cross-sectional view illustrating two of the conduit inserts of FIG. 1 inserted into an existing duct in back-to-back relationship.

FIGS. 1 and 2 show a conduit insert 11 which includes a pair of spaced apart longitudinally extending chambers 12 and 13. The chamber 12 is defined by a flat base wall 14, an outer side wall 15, an inner side wall 16, a flat top wall 17, and a curved wall portion 18 connecting the outer side wall 15 to the top wall 17. The chamber 13 is defined by a flat base wall 19, an outer side wall 20, an inner side wall 21, a flat top wall 22 which is coplanar with the top wall 17, and a curved wall portion 23 connecting the top wall 22 to the outer side wall 20.

The inner side walls 16 and 21 extend in substantially parallel relationship and abut one another. If the inner walls 16 and 21 were formed as a single wall, such a wall would be completely enclosed within the other walls of the conduit insert 11. Thus, during the manufacture of the conduit insert any cooling medium would contact all of the walls of the conduit insert with the exception of the inner walls 16 and 21. These inner walls would cool more slowly than the outer walls and increase the production time per a unit length of the conduit insert.

The conduit insert according to the present invention has been provided with separate inner walls 16 and 21 which are joined together by a hinge portion 24 connecting the adjacent edges of the flat base wall 14, the inner side wall 16, the flat base wall 19, and the inner side wall 21. The hinge portion 24 also includes a longitudinally extending channel 25, the hinge portion 24 and channel 25 cooperating to form a living hinge permitting the opposite ends of the inner side walls 16 and 21 to be moved apart as shown in FIG. 3.

FIGS. 3 and 4 show the conduit insert 11 as it is positioned during the manufacturing process. The chambers 12 and 13 are positioned on opposite sides of a vertical center line 26 which extends through the hinge portion 24 and the channel 25. The inner side walls 16 and 21 form angles 27 and 28 respectively with the center line 26. The angles 27 and 28 are each approximately ten degrees. The channel 25, which is shown as having a curved wall, tends to reduce the thickness of the hinge portion 24 in the area of the center line 26 to enable the hinge portion 24 to function as a living hinge. As the separation between the inner side walls 16 and 21 increases, the width of the channel 25 tends to decrease as shown. Although shown in the form of a section of a circle, the cross-sectional configuration of the channel 25 can be of any convenient shape.

Referring to FIG. 5, the conduit insert 11 can be inserted into a single chambered conduit 29. Two individual conduit inserts 11 can be positioned in back-to-back relationship within the conduit 29. The radius of the outer surface of the curved wall portions 18 and 23 is different from the radius of the inner wall of the conduit 29 such that contact between the wall portions 18 and 23 of the lower insert and the inner surface of the conduit 29 is line-to-line contact at points 30 and 31.

While in the preferred embodiment of the invention shown in the drawings, the individual insert sections are adapted to be maintained in the desired position within the duct by means of the inner wall of the duct, it will be appreciated that means can be provided for attaching the two individual insert sections to one another prior to inserting the sections within the conduit. For example, the wall 14 of the insert section 11 can be provided with a downwardly depending and longitudinally extending lock lug portion (not shown) which can be inserted into a cooperating locking lug receiving groove (not shown) formed in adjacent outer wall portions of the cooperating lower insert section 11. Also, while not shown in the drawings, it may be desirable in some instances to provide a means for identifying the individual chambers. For example, an identification means such as one or more longitudinally extending ribs can be molded into one or more of the walls of each chamber to enable each chamber to be individually identified at any point along the entire length of the insert.

Figure 6:
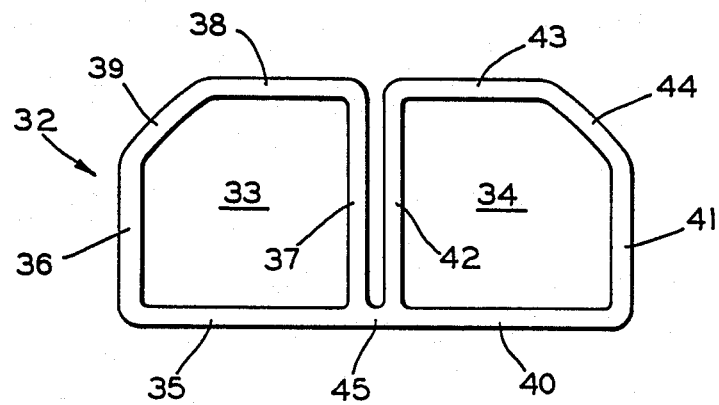
FIG. 6 is an end elevational view of an alternate embodiment of a conduit insert according to the present invention.

A conduit insert 32 according to an alternate embodiment of the present invention is shown in FIG. 6. The insert 32 includes a pair of longitudinally extending chambers 33 and 34. The chamber 33 is defined by a flat base wall 35, an outer side wall 36, an inner side wall 37, a flat top wall 38, and a curved wall portion 39 connecting the outer side wall 36 to the top wall 38. The chamber 34 is defined by a flat base wall 40, an outer side wall 41, an inner side wall 42, a flat top wall 43, and a curved wall portion 44 connecting the top wall 43 to the outer side wall 41. The inner side walls 37 and 42 extend substantially parallel to one another and are spaced apart. The adjacent edges of the inner side walls 37 and 42 and the flat base walls 35 and 40 are connected together by a hinge portion 45. The hinge portion 45 does permit some movement between the chambers 33 and 34, but does not have to be a living hinge since the inner side walls 37 and 42 are spaced apart to enable any of the cooling medium to contact them during the manufacturing process.

Figure 7:
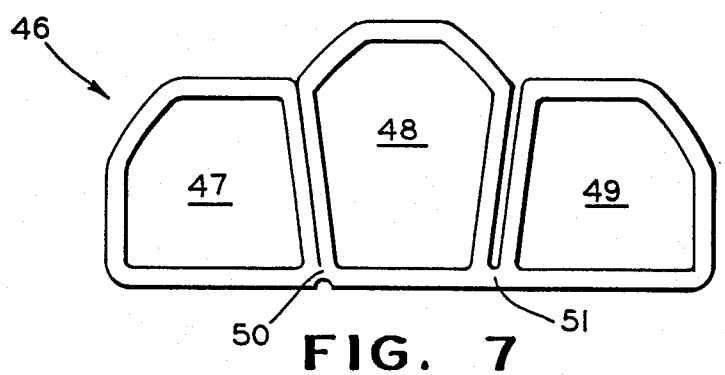
FIG. 7 is an elevational view of yet another alternate embodiment of a conduit insert according to the present invention.

There is shown in FIG. 7 a second alternate embodiment of the present invention. A conduit insert 46 includes three longitudinally extending chambers, a left chamber 47, a center chamber 48, and a right chamber 49. The left chamber 47 and the center chamber 48 are attached in a manner similar to the conduit insert 11 of FIG. 1. A hinge portion 50 formed as a living hinge connects the adjacent ends of the inner side walls and flat base walls of the chambers 47 and 48. The chambers 48 and 49 are connected by a hinge portion 51 which is similar to the hinge portion 45 of the conduit insert 32 shown in FIG. 6. Typically, the hinge portions 50 and 51 would both be of the same type for ease of manufacturing.

While a number of different plastic materials, e.g., polyvinylchloride and olefins in general, may be utilized to form the conduit inserts of the invention particularly excellent results have been obtained utilizing linear low density polyethylene. The nature of the plastic material imparts to the finished product appropriate physical strength and inertness to moisture.

In accordance with the provisions of the patent statutes, the principles and mode of operation of the present invention have been illustrated and described in what is considered to represent its preferred embodiment. However, it should be understood that the invention may be practiced otherwise than as specifically illustrated and described without departing from its spirit or scope.

What is claimed is:

1. A method of forming a multi-chambered conduit insert comprising the steps of:
   (a) forming a longitudinally extending first chamber having substantially parallel inner and outer walls connected together at respective edges by a bottom wall and a top wall;
   (b) simultaneously forming a second longitudinally extending chamber substantially parallel to said first chamber and having substantially parallel inner and outer walls joined at respective edges by a bottom and a top wall;
   (c) simultaneously with steps (a) and (b) forming a hinge portion connecting abutting edges of said inner walls and said bottom walls of said first and second chambers whereby said inner walls of said first and second chambers are spaced apart; and (d) exposing exterior surfaces of said first and second chambers including said spaced apart inner walls to a cooling medium.

2. The method according to claim 1 including a step of moving said inner walls of said first and second chambers into abutting relationship after performing said step (d).

3. The method according to claim 1 including forming a longitudinally extending channel in said hinge portion simultaneously with performing steps (a), (b), and (c).

4. The method according to claim 1 wherein said conduit insert is composed of a plastic material and said forming steps comprise a continuous extrusion process.

5. The method according to claim 2 wherein said plastic material is linear low density polyethylene.

* * * * *